(12) United States Patent
Durant et al.

(10) Patent No.: US 6,417,947 B1
(45) Date of Patent: Jul. 9, 2002

(54) FREE SPACE LIGHT MULTIBEAM NETWORK BRIDGE APPARATUS AND METHODS

(75) Inventors: Gregory Michael Durant, Neshanic Station; Christopher Lee Rutledge, Somerset, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/414,138

(22) Filed: Oct. 7, 1999

(51) Int. Cl.[7] .............................................. H04B 10/00
(52) U.S. Cl. ...................... 359/155; 359/159; 359/172; 356/141.2
(58) Field of Search ................................ 359/159, 155, 359/172; 379/56-3; 356/3-12, 123, 139.07, 141.2

(56) References Cited

U.S. PATENT DOCUMENTS

| | | | |
|---|---|---|---|
| 4,081,669 A | * 3/1978 | Klingman, III | 250/199 |
| 5,774,362 A | * 6/1998 | Suzuki et al. | 364/443 |
| 5,923,417 A | * 7/1999 | Leis | 356/141.1 |
| 6,282,362 B1 | * 8/2001 | Murphy et al. | 386/46 |

* cited by examiner

*Primary Examiner*—Kinfe-Michael Negash (57) ABSTRACT

A free space light multibeam network bridge apparatus receives free space light beam communication signals from free space light communication devices and routes the free space light beam communication signals to other free space light communication devices via a free space light network or to non-free space light destination devices via a telecommunications network. The free space light multibeam network bridge apparatus identifies the source of a free space light beam communication signal based on the position of the free space light beam communication signal on a sensor.

14 Claims, 5 Drawing Sheets

FREE SPACE LIGHT MULTIBEAM NETWORK BRIDGE APPARATUS AND METHODS

BACKGROUND OF THE INVENTION

1. Field of Invention

The invention is directed to free space light multibeam network bridge apparatus and methods.

2. Description of Related Art

Free space light beam communication systems are generally known in the art. However, the known free space light beam communication systems are limited to communication with a single free space light beam source. If multiple sources are utilized, the actual source of the free space light beam communication signal may not be accurately determined. Thus, there is a need for new technology to accurately determine the source of a free space light beam communication signal.

SUMMARY OF THE INVENTION

A free space light multibeam network bridge apparatus receives free space light beam communication signals from free space light communication devices and routes the free space light beam communication signals to other free space light communication devices via a free space light network or to non-free space light destination devices via a telecommunications network. The free space light multibeam network bridge apparatus identifies the source of a free space light beam communication signal based on the position of the free space light beam communication signal on a sensor. The free space light multibeam network bridge apparatus retrieves information corresponding to the identified source. The retrieved information is then used to forward the communication signal to the intended destination device as well as to send a return communication signal from the destination device to the source free space communication device.

BRIEF DESCRIPTION OF THE DRAWINGS

The invention is described with reference to the following drawings, wherein like numerals designate like elements, and wherein.

DETAILED DESCRIPTION OF PREFERRED EMBODIMENTS

Figure 1:
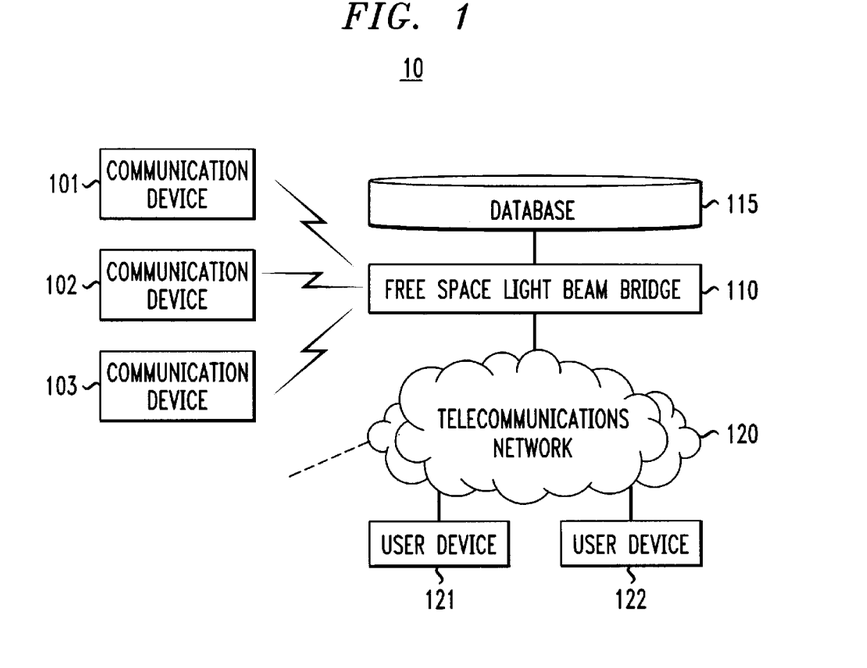
FIG. 1 is an exemplary block diagram of a free space light beam telecommunications network system.

FIG. 1 is an exemplary block diagram of a hybrid wireless free space light beam telecommunications network system 10. As shown in FIG. 1, the system 10 includes free space light communication devices 101–103, a free space light beam bridge 110, a database 115, a telecommunications network 120, and user devices 121–122.

The communication devices 101–103 may be any type of device that may send and/or receive free space light beam communication signals. For example, the communication devices 101–103 may be free space light beam communication devices, free space light beam base stations, free space light beam networks, and the like. The free space light beam communication signals may be of the same or different wavelengths, as described more fully below.

The free space light beam bridge 110 receives free space light beam communication signals from the free space light communication devices 101–103 that are destined for either another free space light communication device 101–103 or a user device 121–122 that is coupled to the telecommunications network 120. The telecommunications network 120 may be any type of telecommunications network that is capable of sending and receiving communication signals. For example, the telecommunications network 120 may be a local telephone network, a long distance telephone network, a cellular telephone network, a satellite communications network, and the like. The telecommunications network 120 may also include data networks such as the Internet, intranets, local area networks (LANs), wide area networks (WANs), and the like. Furthermore, the telecommunications network 120 may include more than one network and may include a plurality of different types of networks. Thus, the telecommunications network 120 may include a plurality of data networks, a plurality of telecommunications networks, a combination of data and telecommunications networks, and the like.

The user devices 121–122 may be any type of device that is capable of sending and/or receiving communication signals. For example, the user devices 121–122 may be computers, terminals, wired or wireless telephones, WebTV™ terminals, personal digital assistants (PDAs), and the like. Any type of communication device may be used without departing from the spirit and scope of the invention.

For simplicity of the following description of the exemplary embodiments, it is assumed that the user devices 121–122 are telephones which send and receive communication signals to and from the telecommunications network 120. It is further assumed that the telecommunications network 120 is a single non-free space light beam telecommunications network which routes non-free space light beam communication signals to and from the user devices 121–122.

When a free space light beam communication signal is sent from the communication device 101 to the user device 121, for example, the free space light beam communication signal is first received by the free space light beam bridge 110. The free space light beam bridge 110 identifies the communication device 101 based on a position of the incident free space light beam, i.e., the free space light beam communication signal transmitted by the communication device 101, on a sensor array.

The free space light beam bridge 110 identifies the communication device 101 by retrieving information corresponding to the communication device 101 from the database 115 based on the detected position of the free space light beam communication signal on the sensor array. The information may include a physical location of the communication device 101 that specifies a light beam transmission direction for sending return communication signals to the communication device 101, for example. The information may be included as header information of communication signals routed through the telecommunications network 120, for example.

The free space light beam bridge 110 generates non-free space light beam communication signals that include the above header information and communication data received from the free space light beam communication signal transmitted by the communication device 101. The free space light beam bridge 110 sends the non-free space light beam communication signal to the appropriate user device 121–122 via the telecommunications network 120.

The user device 121 may send non-free space light beam communication signals back to the communication device 101. The telecommunication network 120 routes the non-free space light beam communication signals to the free space light beam bridge 110. When the non-free space light beam communication signals are received, the free space light beam bridge 110 extracts the transmission direction from the header information and transmits a free space light beam communication signal in the transmission direction to the communication device 101. If the header information does not include a transmission direction, the free space light beam bridge 110 may determine the transmission direction via the database 115 based on the destination address for the communication device 110.

Figure 2:
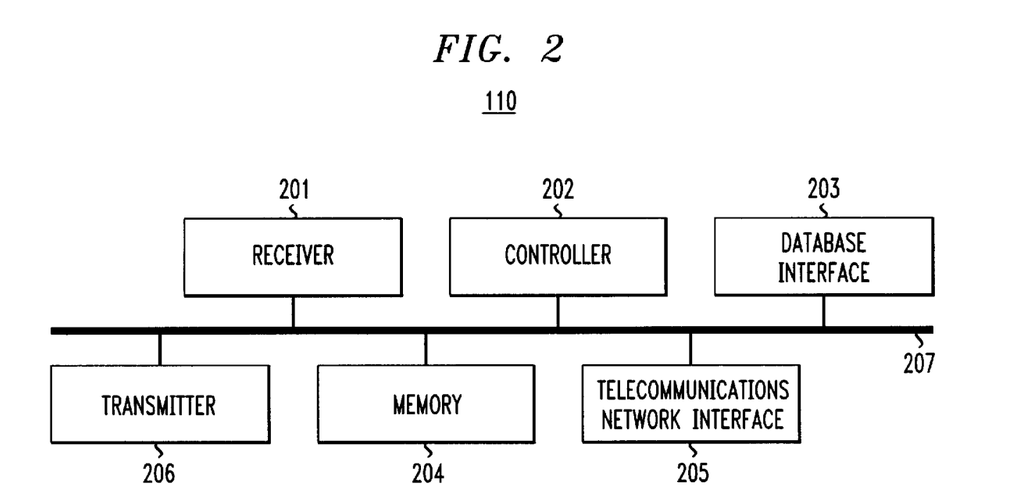
FIG. 2 is an exemplary block diagram of the free space light beam bridge of FIG. 1.

FIG. 2 is an exemplary block diagram of the free space light beam bridge 110 of FIG. 1. As shown in FIG. 2, the free space light beam bridge 110 includes a receiver 201, a controller 202, a database interface 203, a memory 204, a telecommunications network interface 205, and a transmitter 206. The elements 201–206 are coupled together via a control/signal bus 207; however, other configurations for coupling the elements 201–206 may be used without departing from the spirit and scope of the invention.

When the free space light beam bridge 110 receives a free space light beam communication signal via the receiver 201, the controller 202 determines, from a position of the free space light beam communication signal on a sensor array of the receiver 201, the information relating to the physical location of the communication device 101–103 from which the signal was sent. This determination may be performed by determining the position of the free space light beam on the sensor array and correlating this position with a physical location table stored in the memory 204 or database 115, for example.

The controller 202 may retrieve other information from the database 115, through database interface 203, such as light beam transmission direction, light beam wavelength, and routing information, for example. The above retrieved information may be included in header information of non-free space light beam communication signals so that return communication signals may also include this information to facilitate transmission of the return communication signals to the communication devices 101–103.

The controller 202 then instructs the telecommunications network interface 205 to generate a non-free space light beam communication signal using the information retrieved from the database 115 and the communication data contained in the free space light beam communication signal. The telecommunications network interface 205 then transmits the non-free space light beam communication signal to the telecommunications network 120 where the non-free space light beam communication signal is routed, in a conventional manner, to the appropriate user device 121–122 designated in the header information of the non-free space light beam communication signal.

When the free space light beam bridge 110 receives non-free space light beam communication signals from a user device 121–122 via the telecommunications network 120, through telecommunications network interface 205, the controller 202 may extract required information from the header information of the non-free space light beam communication signals for transmitting the communication signals to a destination free space light communication device 101–103. The controller 202 may also retrieve the needed information from the database 115, through database interface 203, corresponding to the destination free space light communication device 101–103. The information retrieved may include wavelength designations for the destination free space light communication device 101–103, transmission directions and/or inclinations, the physical location of the destination communication device 101–103, and the like.

Based on the information retrieved, the free space light beam bridge 110 may redirect the transmitter 206 for transmitting the free space light beam communication signal in an appropriate direction for reception by the intended destination free space light communication device 101–103. The transmitter 206 then generates and transmits a free space light beam communication signal, with the communication data contained in the received non-free space light beam communication signal, to the destination communication device 101–103.

Figure 3:
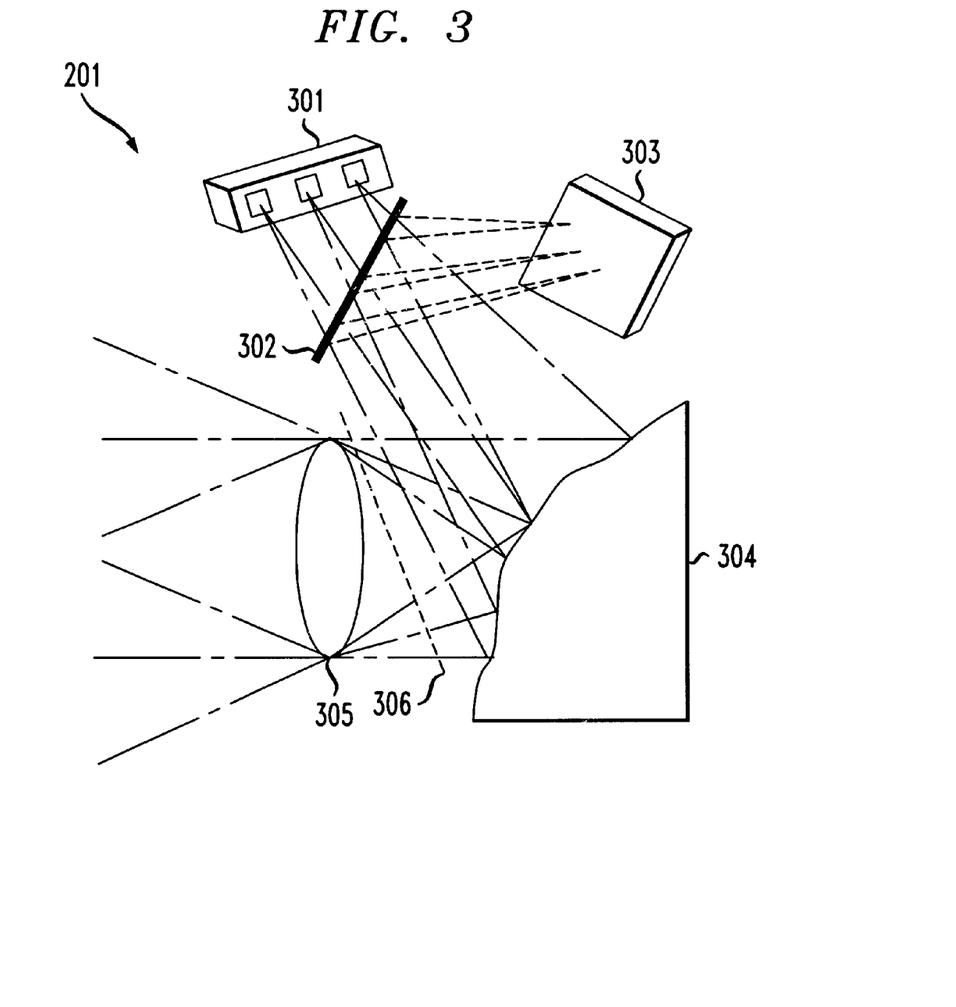
FIG. 3 is an exemplary diagram of the receiver of FIG. 2.

FIG. 3 is an exemplary diagram of the receiver 201 of FIG. 2. As shown in FIG. 3, the receiver 201 includes high speed detectors 301, a beam splitter 302, sensor array 303, reflective surface 304, focusing element 305 and optional grating 306. Free space light beam communication signals are focused by the focusing element 305 onto the reflective surface 304 through optional grating 306. The focusing element 305 may be of any appropriate type, such as a catoptric, dioptric or hybrid focusing element.

The reflective surface 304 reflects the free space light beams through the beam splitter 302 to the high speed detectors 301. The high speed detectors 301 detect the free space light beam communication signals, and processors (not shown) associated with the high speed detectors 301 read and process the communication data contained within the free space light beam communication signals. This communication data is stored and later used to generate a non-free space light beam communication signal, as discussed below.

A portion of the free space light beam communication signal is directed to the sensor array 303 by the beam splitter 302. The portion of the free space light beam communication signal that is directed to the sensor array 303 by the beam splitter 302 falls incident on a particular position of the sensor array 303 based on the angle at which the free space light beam communication signal intersects the beam splitter 302. The angle at which all free space light beam communication signals intersect the beam splitter 302, and hence their position on the sensor array 303, for the same communication device 101–103 remains the same. That is, all free space light beam communication signals from a particular free space light communication device 101, for example, will be focused onto the sensor array at the same position. Thus, the free space light beam bridge 110 may determine the source of the free space light beam communication signal by determining the position of the free space light beam on the sensor array 303.

The reflective surface 304 may be adjustable to accommodate relocation of the free space light communication device 101–103. Alternatively, the information in the database 115 may be updated to reflect the change in position of the free space light beam on the surface of the sensor array 303.

Thus, for example, if a communication device 101 is moved from a first location to a second location, the reflective surface may be adjusted such that the free space light beam communication signal received from the second location is split by the beam splitter 302 in the same manner as before the relocation of the communication device 101 to the second location. In this way, the position of the free space light beam on the surface of the sensor array 303 remains the same as before the relocation of the communication device 101.

The sensor array 303 senses a position of the free space light beam on its surface and translates that position into a coordinate representation. The coordinate representation is then used by the controller 202 to identify the free space light communication device 101–103 of the free space light beam communication signal by looking up the coordinates in a communication device table stored in memory 204 or database 115. Based on the identification of the free space light communication device 101–103, the controller 202 retrieves communication device information, such as communication device routing information, from the database 115. The communication device information may then be included in header information of the non-free space light beam communication signal sent to the destination user device so that communication signals may be sent back to the communication device appropriately.

The optional grating 306 is not a necessary element but is used only to aid in expanding the difference in position of the incident free space light beams on the sensor array 303 in the case where a number of almost coincident free space light beams at different wavelengths are utilized. The optional grating 306 is not necessary in the case where the free space light beams are of the same wavelength and have sufficient distance between them to provide clear indications on the sensor array of the source of the free space light communication signal.

As discussed above, the free space light beam communication signals may be of the same or different wavelengths. In the case of different wavelengths being assigned to each communication device 101–103, for example, the sensor array 303 may further include a plurality of filters which allow free space light beams of corresponding wavelengths through to be sensed by the sensor array 303. In this way, only free space light beams that are of the correct wavelength may be sensed by the sensor array 303.

Figure 4:
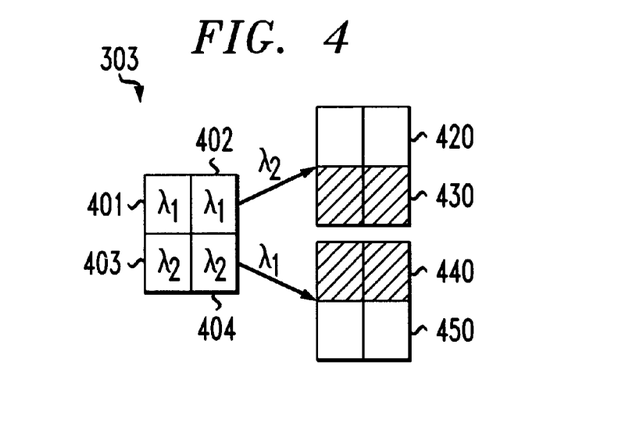
FIG. 4 is an exemplary diagram describing the use of filters on the sensor array of FIG. 3.

FIG. 4 illustrates this exemplary feature. As shown in FIG. 4, the sensor array 303 includes two filters $\lambda_1$ and $\lambda_2$ over sensor cells 401, 402, 403 and 404, respectively. Thus, when a free space light beam having a wavelength of $\lambda_1$ becomes incident on the sensor array 303, if the free space light beam falls incident on the sensor cells 401 and 402, the free space light beam will be detected by the portion 430 of the sensor array 303. If the free space light beam does not fall on the sensor cells 401 and 402, the free space light beam will not be detected by the sensor array 303.

The same is true of a free space light beam of wavelength $\lambda_2$. That is, if the free space light beam of wavelength $\lambda_2$ falls incident on the sensor cells 403 and 404, the sensor array 303 will detect the light beam. Otherwise the sensor array 303 will not detect the light beam.

This provides added security against an unregistered party using a device having the same wavelength as a registered party, from a different location. Thus, with the invention, the unregistered party would not only have to know the wavelength of the free space light beam communication signals of the registered party but also must send the free space light beam communication signals from the same physical location as the registered party.

The use of different wavelengths for the communication devices 101–103 also provides the ability to use more closely located communication devices 101–103. For example, if an apartment building comprised of eight apartments were to use a free space light beam network for communication, if the same wavelength is used for each of the eight apartments, it may be difficult to discern the actual source of the communication signal because of their physically close proximity to one another. By assigning each communication device, i.e., each apartment or each communication device within an apartment, a different wavelength on which to communicate and by using filters on the sensor array 303, the actual source of the free space light communication signal may be determined more accurately.

In addition to the above, the invention does not require that the high speed detectors 301 and the sensor array 303 be separate devices. Rather, the high speed detectors 301 and the sensor array 303 may be incorporated into a single device. In such a case, the sensor array 303 may detect not only the position of the free space light beams on the sensor array 303 surface but also the communication data included in the free space light beam communication signals. The position and communication data information may be utilized by the controller 202 to generate a non-free space light beam communication signal for transmission over the telecommunications network 120.

Figure 5:
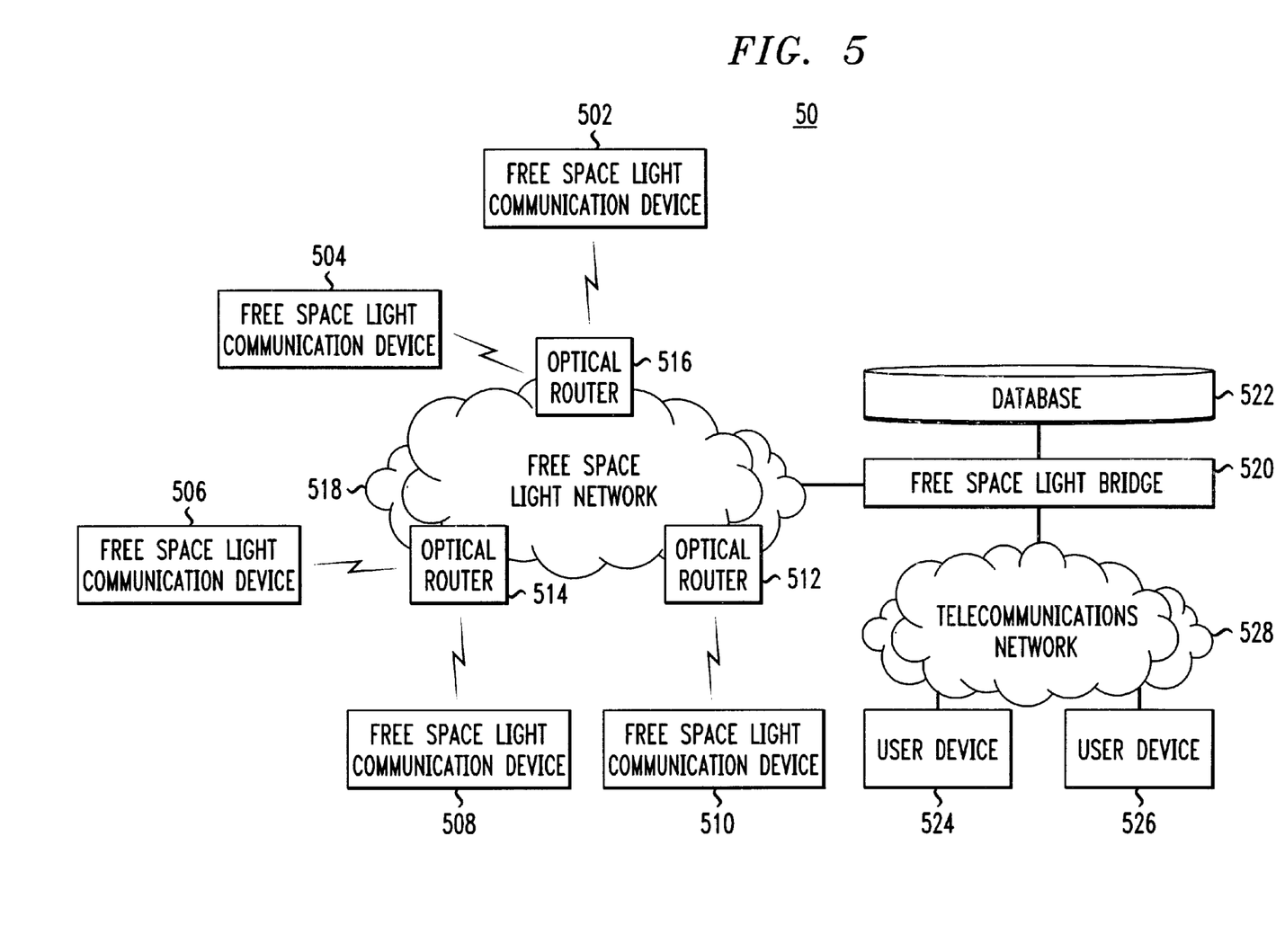
FIG. 5 is an exemplary block diagram of a hybrid free space light beam network/telecommunications network system.

The free space light communication devices 101–103 need not communicate directly with the free space light bridge 110 but may communicate with the free space light bridge 110 via a free space light network as shown in FIG. 5. FIG. 5 is an exemplary block diagram of a free space light network/telecommunications network system 50. As shown in FIG. 5, the system 50 may include a plurality of free space light communication devices 502–510, a free space light network 518, free space light bridge 520, database 522, telecommunications network 528, and user devices 524–526. The free space light network 518 may further include one or more optical routers 512–516, as discussed below.

The optical routers 512–516 are transceivers that receive free space light communication signals from the free space light communication devices 502–510 and route the communication signals, by way of retransmission, to the free space light bridge 520. The routing of the communication signals may include retransmission of a free space light communication signal to other optical routers 512–516 before they are eventually routed to the free space light bridge 520.

The receiver and transmitter of the optical routers 512–516 may be similar to the receiver 201 and transmitter 206 of FIG. 2. That is, the receiver of the optical routers 512–516 may determine the source of the free space light communication signal based on a position of the free space light communication signal on a sensor array and may direct the positioning of the transmitter based on the geographical location of the destination free space light communication device 502–510.

The operation of the free space light bridge 520 is essentially the same as that of the free space light bridge 110 of FIG. 1. However, due to the routing of the free space light communication signal through the free space light network 518, additional routing information needs to be included in the header information of the communication signal so that return communication signals may be routed to the appropriate optical router 512–516 and ultimately to the appropriate free space light communication device 502–510.

When a free space light communication device 502 initiates a communication with a user device 526, for example, the free space light communication signal is sent from the free space light communication device 502 to the optical router 516. The optical router 516 adds an identifier for the free space light communication device 526 to the header information of the free space light communication signal. The identifier for the free space light communication device 526 may be obtained by determining a position of the free space light communication signal on a sensor array, in a similar manner as that of the receiver 201 of FIG. 2. The optical router 516 may also add to the header a sensor position and an identification of the optical router 516 and rely on the free space light bridge 520 to determine physical locations, transmission directions, and routing information, for example.

The free space light communication signal, along with the identifier of the free space light communication device 502, is retransmitted to the free space light bridge 520. The free space light bridge 520 performs similar processing of the free space light communication signal as that of the free space light bridge 110.

When a return non-free space light communication signal from the user device 526 is received, the free space light bridge 520 identifies the destination free space light communication device 502 from the header information and determines routing information from the database 522. Thereby, the free space light bridge 520 may redirect the transmitter to transmit the free space light communication signal to the appropriate optical router 516 for retransmission to the free space light communication device 502.

With the system 50 of FIG. 5, either each of the optical routers 512–516 may know the topology of the free space light network 518 or the free space light bridge 520 may append the routing information to the header information of the free space light communication signal based on information in the database 522. Thus, for a free space light communication signal that is destined for free space light communication device 506, the optical router 512 may know that free space light communication signals destined for the free space light communication device 506 are to be routed through the optical router 514.

Alternatively, the free space light bridge 520 may provide, in the header information of the free space light communication signal, the identity of each of the optical routers 512–516 through which the free space light communication signal may be routed. In this way, the optical router 512 need only read the header information to determine where to retransmit the free space light communication signal.

Figure 6:
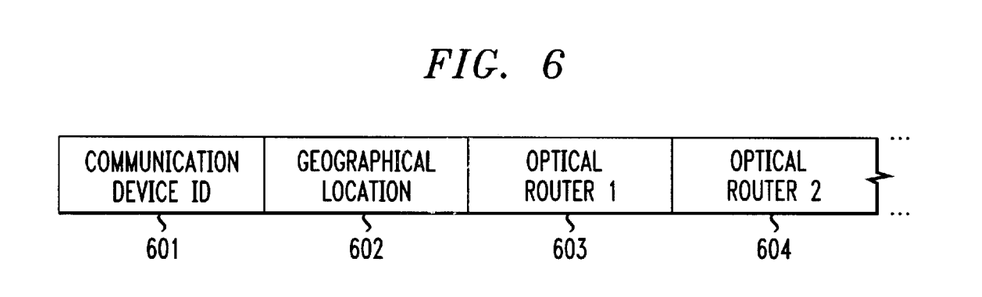
FIG. 6 is an exemplary diagram of a header of a communication signal used with the system of FIG. 5.

FIG. 6 is an exemplary diagram of header information of the free space light communication signal from the free space light bridge 520. As shown in FIG. 6, the header information includes a field 601 for the free space light communication device ID, a field 602 for the geographical location of the free space light communication device, a field 603 for the identifier of the first optical router through which the free space light communication signal is to be routed, a field 604 for the second optical router, and so on. The optical routers 512–516 use fields 603, 604 and the like to determine how to retransmit the free space light communication signal through the free space light network 518. Once the appropriate optical router 512–516 receives the free space light communication signal, the optical router 512–516 may use the geographical location information to determine how to redirect the transmitter to transmit the free space light communication signal to the destination free space light communication device 506, for example.

Figure 7:
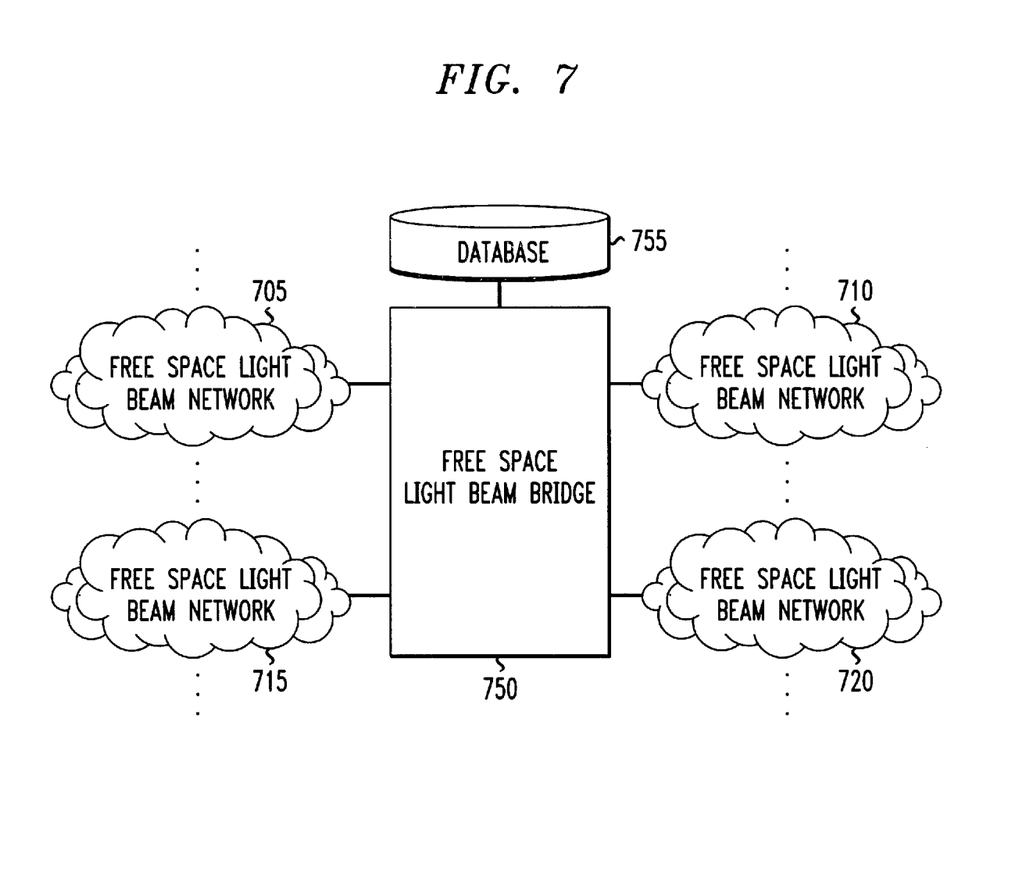
FIG. 7 is an exemplary diagram showing the free space light beam bridge as a bridge between a plurality of free space light beam networks.

The free space light beam bridge 110 is not limited to bridging communication between a free space light beam network 104 and a telecommunications network 120. Rather, as shown in FIG. 7, the free space light beam bridge 750 may bridge communications between a plurality of free space light beam networks 705, 710, 715 and 720. With such an arrangement, the free space light beam bridge 750 may require a separate receiver 201 and transmitter 206 for each free space light beam network 705–720. The controller 202 may then determine source not only based on the position of the incident free space light beam on the sensor array 303 but also based on which sensor array 303 the free space light beam is incident.

In this case, the free space light beam bridge 750 generates a new free space light beam communication signal, encoded with the communication data, in the direction of the intended destination device. If each free space light beam network 705–720 is set to communicate on a different wavelength or the intended destination device communicates on a different wavelength than that of the communication device, the free space light beam bridge 750 may convert the wavelength appropriately when generating the new free space light communication signal so that it may be properly received by the destination device. The wavelength and proper orientation of the transmitter 206 may be determined from information retrieved from the database 115 as described above.

Figure 8:
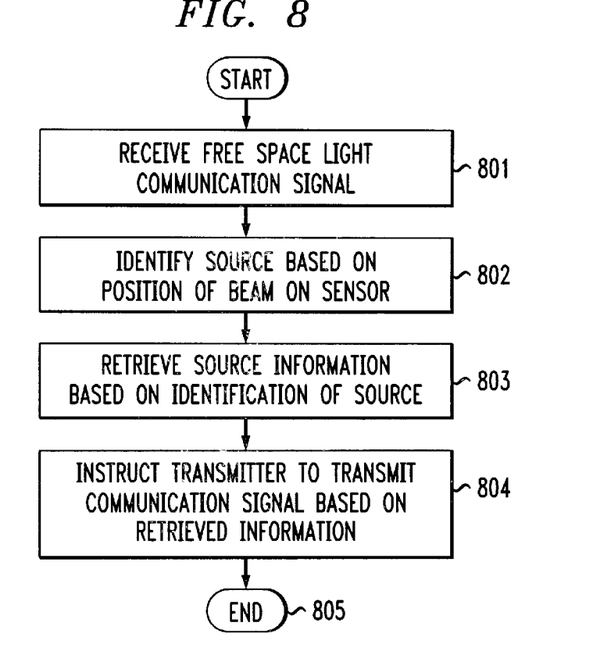
FIG. 8 is a flowchart outlining an exemplary operation of the free space light beam bridge when a free space light beam communication signal is received for routing.

FIG. 8 is a flowchart outlining an exemplary operation of the free space light beam bridge 110 or 550 when receiving a free space light beam communication signal for routing. As shown in FIG. 8, in step 801, the controller 202 receives a free space light beam communication signal and goes to step 802. In step 802, the controller 202 identifies the communication device from which the free space light beam communication signal was sent based on the position of the free space light beam communication signal on the sensor array 303. As described above, in a system where multiple free space light networks are interconnected using the free space light beam bridge 750, the identification of the communication device may also be dependent on which receiver received the free space light beam communication signal.

In step 803, based on the identified communication device, the controller 202 retrieves information from the database 115 and goes to step 804. In step 804, the controller 202 instructs the transmitter 206 to transmit a communication signal, either a free space light beam communication signal or a non-free space light beam communication signal depending on the particular embodiment, using the information retrieved from the database 115 and the communication data received in the original free space light beam communication signal. Control then ends in step 805.

Figure 9:
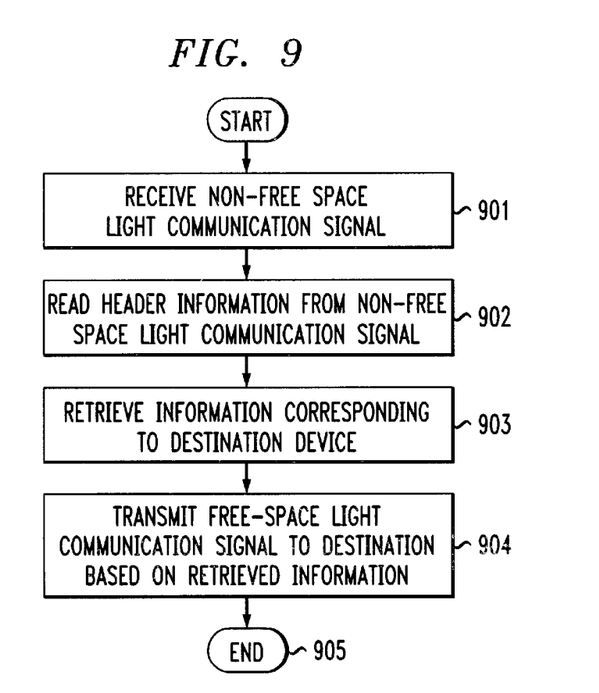
FIG. 9 is a flowchart outlining an exemplary operation of the free space light beam bridge when a non-free space light beam communication signal is received for routing through a free space light network.

FIG. 9 is a flowchart of an exemplary operation of the free space light beam bridge 110 when a non-free space light beam communication signal is received from the telecommunications network 120 for routing the communication signal to a destination free space light communication device 101–103. As shown in FIG. 9, in step 901, the controller 202 receives the non-free space light beam communication signal and goes to step 902. In step 902, the controller 202 reads the header information of the non-free space light communication signal and goes to step 903.

In step 903, the controller 202 retrieves information from the database 115 corresponding to the destination communication device 101–103 and goes to step 904. In step 904, the controller 202 instructs the transmitter 206 to transmit a free space light beam communication signal to the destination communication device 101–103 based on the retrieved information and the communication data received in the non-free space light beam communication signal. Control then ends in step 905.

As shown in FIG. 2, the method of this invention is preferably implemented on a programmed processor. However, the free space light beam bridge 110 and 520 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device which is capable of implementing the flowcharts shown in FIG. 8 and/or FIG. 9 can be used to implement the functions of the free space light beam bridge 110, 520 or 750 according to this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of identifying a source of a free space light beam communication signal, comprising:
   receiving the free space light beam communication signal from a source,
   determining a position of the free space light beam communication signal on a sensor; and
   identifying the source of the free space light beam communication signal by retrieving information from a database based on the position of the free space light beam communication signal on the sensor, wherein the information from the database includes at least one of a physical location of the source, a light beam transmission direction, light beam wavelength, and routing information.

2. The method of claim 1, wherein the free space light beam communication signal includes header information identifying one or more optical routers through which the free space light beam communication signal was routed and wherein identifying the source of the free space light beam communication signal includes reading the header information of the free space light beam communication signal.

3. A method of routing communication signals between a source and a destination device using the method of claim 1, comprising:
   retrieving information from a database corresponding to the position of the free space light beam communication signal; and
   transmitting a communication signal to the destination device based on the information retrieved from the database.

4. The method of claim 3, wherein the information retrieved from the database includes header information for inclusion in a header of the communication signal, and wherein transmitting a communication signal includes generating a communication signal based on the retrieved header information and communication data included in the received free space light beam communication signal.

5. The method of claim 4, wherein the header information includes at least one of a physical location of the source, a light beam transmission direction, light beam wavelength, and routing information.

6. The method of claim 3, wherein the communication signal is one of a free space light beam communication signal and a non-free space light beam communication signal.

7. The method of claim 3, further comprising:
   receiving a return communication signal from the destination device;
   extracting destination information from the return communication signal;
   retrieving transmission information for the source based on the extracted destination information; and
   transmitting a free space light beam return communication signal to the source based on the transmission information.

8. The method of claim 7, wherein the transmission information includes at least one of routing information for routing a communication signal through a free space light network and a physical location of the source.

9. The method of claim 3, further comprising:
   receiving a return communication signal from the destination device;
   extracting transmission information for the source from the return communication signal; and
   transmitting a free space light beam return communication signal to the source based on the transmission information.

10. An apparatus for identifying a source of a free space light beam communication signal, comprising:
    a receiver for receiving a free space light beam communication signal; and
    a controller for identifying a source of the free space light beam communication signal based on a position of the free space light beam communication signal on the receiver, by retrieving information from a database corresponding to the position of the free space light beam communication signal on the receiver, wherein the information from the database includes at least one of a physical location of the source, a light beam transmission direction, light beam wavelength, and routing information.

11. The apparatus of claim 10, wherein the free space light beam communication signal includes header information identifying one or more optical routers through which the free space light beam communication signal was routed and wherein the controller identifies the source of the free space light beam communication signal based on the header information of the free space light beam communication signal.

12. The apparatus of claim 10, wherein the receiver comprises:

a focusing element;
a reflective surface;
a beam splitter;
a sensor; and
one or more detectors, wherein the focusing element focuses the free space light beam communication signal onto the reflective surface, the reflective surface reflects the free space light communication signal through the beam splitter, and the beam splitter splits the free space light beam communication signal into a first beam and a second beam, the first beam being directed to the one or more detectors and the second beam being directed to the sensor.

13. The apparatus of claim 12, wherein the reflective surface is adjustable.

14. The apparatus of claim 12, further comprising an optical grating, wherein the optical grating enhances the separation of multiple free space light communication signals passing through the focusing element.

* * * * *